US010547847B2

(12) United States Patent
Jang et al.

(10) Patent No.: US 10,547,847 B2
(45) Date of Patent: Jan. 28, 2020

(54) AMVR-BASED IMAGE CODING METHOD AND APPARATUS IN IMAGE CODING SYSTEM

(71) Applicant: LG ELECTRONICS INC., Seoul (KR)

(72) Inventors: Hyeongmoon Jang, Seoul (KR); Jaehyun Lim, Seoul (KR); Seungwook Park, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/761,356

(22) PCT Filed: Mar. 3, 2016

(86) PCT No.: PCT/KR2016/002161
§ 371 (c)(1),
(2) Date: Mar. 19, 2018

(87) PCT Pub. No.: WO2017/052009
PCT Pub. Date: Mar. 30, 2017

(65) Prior Publication Data
US 2018/0270485 A1    Sep. 20, 2018

Related U.S. Application Data

(60) Provisional application No. 62/222,791, filed on Sep. 24, 2015.

(51) Int. Cl.
*H04N 19/139*    (2014.01)
*H04N 19/176*    (2014.01)
(Continued)

(52) U.S. Cl.
CPC ......... *H04N 19/139* (2014.11); *H04N 19/176* (2014.11); *H04N 19/51* (2014.11); *H04N 19/517* (2014.11); *H04N 19/52* (2014.11)

(58) Field of Classification Search
CPC .. H04N 19/139; H04N 19/176; H04N 19/503; H04N 19/51; H04N 19/52; H04N 19/517
(Continued)

(56) References Cited

U.S. PATENT DOCUMENTS 9,544,588 B2 *    1/2017  Lee ..................... H04N 19/513
9,883,186 B2 *    1/2018  Lee ..................... H04N 19/513
(Continued)

FOREIGN PATENT DOCUMENTS

EP    0731614 A2    9/1996
EP    3413568 A1    12/2018
(Continued)

OTHER PUBLICATIONS

Zhang K et al.: "On adaptive motion vector resolution" Document of Joint Collaborative Team on Video Coding, JCTVC-T0059, Feb. 2015 (Year: 2015).*
(Continued)

*Primary Examiner* — Christopher S Kelley
*Assistant Examiner* — Asmamaw G Tarko
(74) *Attorney, Agent, or Firm* — Dentons US LLP

(57) ABSTRACT

An image encoding method according to the present invention, which is performed by an encoding apparatus, comprises the steps of: generating an adaptive motion vector range (AMVR) enable flag; deriving a motion vector difference (MVD) with respect to a current block; deriving a representative MVD value of an MVD range including a value of the MVD from among a plurality of MVD ranges; generating a coded MVD corresponding to the representative MVD value; and outputting the AMVR enable flag and
(Continued)

the coded MVD through a bit stream. According to the present invention, the amount of bits allocated to an MVD can be reduced and the overall coding efficiency can thus be increased.

14 Claims, 16 Drawing Sheets

(51) Int. Cl.
*H04N 19/51* (2014.01)
*H04N 19/517* (2014.01)
*H04N 19/52* (2014.01)

(58) Field of Classification Search
USPC .................................................. 375/240.16
See application file for complete search history.

(56) References Cited

U.S. PATENT DOCUMENTS

| | | | | |
|---|---|---|---|---|
| 10,110,902 | B2* | 10/2018 | Lee | H04N 19/513 |
| 2006/0039472 | A1* | 2/2006 | Barbarien | H04N 19/52 |
| | | | | 375/240.16 |
| 2012/0093226 | A1* | 4/2012 | Chien | H04N 19/139 |
| | | | | 375/240.16 |
| 2012/0128261 | A1* | 5/2012 | Lee | H04N 19/57 |
| | | | | 382/236 |
| 2012/0320980 | A1* | 12/2012 | Shimada | H04N 19/52 |
| | | | | 375/240.16 |
| 2013/0003849 | A1* | 1/2013 | Chien | H04N 19/13 |
| | | | | 375/240.16 |
| 2013/0182760 | A1* | 7/2013 | Sasai | H04N 19/70 |
| | | | | 375/240.02 |
| 2015/0139325 | A1* | 5/2015 | Chuang | H04N 19/51 |
| | | | | 375/240.16 |
| 2015/0281708 | A1* | 10/2015 | Chuang | H04N 19/52 |
| | | | | 375/240.02 |
| 2018/0249171 | A1* | 8/2018 | Lim | H04N 19/51 |

FOREIGN PATENT DOCUMENTS

| | | |
|---|---|---|
| JP | 2012186760 A | 9/2012 |
| JP | 2013005169 A | 1/2013 |
| WO | 2004052000 A2 | 6/2004 |

OTHER PUBLICATIONS

Dong-Shik Lee et al., "Efficient Coding of Motion Vector and Mode Information for H.264/AVC", Journal of Korea Multimedia Society, vol. 11. No. 10, Oct. 10, 2008., pp. 1359-1365.

Zhang, K. et al., "On adaptive motion vector resolution", Joint Collaborative Team on Video Coding (JCT-VC) of ITU-T SG 16 WP 3 and ISO/IEC JTC 1/SC 29/WG 11, Jan. 30, 2015, JCTVC-T0059, XP030117180.

* cited by examiner

FIG. 4

AMVR-BASED IMAGE CODING METHOD AND APPARATUS IN IMAGE CODING SYSTEM

CROSS-REFERENCE TO RELATED APPLICATIONS

This application is the National Stage filing under 35 U.S.C. 371 of International Application No. PCT/KR2016/002161, filed on Mar. 3, 2016, which claims the benefit of U.S. Provisional Application No. 62/222,791 filed on Sep. 24, 2015, the contents of which are all hereby incorporated by reference herein in their entirety.

BACKGROUND OF THE INVENTION

Field of the Invention

The present invention relates to an image coding technique, and more particularly, to an image coding method and apparatus based on an Adaptive Motion Vector Range (AMVR) in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for enhancing video coding efficiency.

The present invention also provides a method and apparatus for improving the efficiency of inter prediction.

The present invention also provides a method of reducing bits allocated to a Motion Vector Difference (MVD) based on an Adaptive Motion Vector Range (AMVR).

The present invention also provides an efficient MVD transmission/reception method based on a linear/non-linear MVD range.

In an aspect, an image encoding method performed by an encoding apparatus includes generating an Adaptive Motion Vector Range (AMVR) enable flag, deriving a Motion Vector Difference (MVD) for a current block, deriving an MVD representative value for an MVD range including a value of the MVD among a plurality of MVD ranges, generating a coded MVD corresponding to the MVD representative value, and outputting the AMVR enable flag and the coded MVD through a bitstream.

In another aspect, an inter prediction method performed by a decoding apparatus includes obtaining an Adaptive Motion Vector Range (AMVR) enable flag from a bitstream, obtaining a coded Motion Vector Difference (MVD) from the bitstream, deriving a value of a representative MVD corresponding to a value of the coded MVD when the value of the MVR enable flag is 1, deriving a Motion Vector Predictor (MVP) for a current block based on a neighboring block of the current block, deriving a Motion Vector (MV) for the current block based on the MVP and the representative MVD, and generating a prediction sample for the current block based on the MV.

In still another aspect, a decoding apparatus for performing inter prediction is provided. The decoding apparatus includes a decoding module that obtains an Adaptive Motion Vector Range (AMVR) enable flag from a bitstream and obtains a coded Motion Vector Difference (MVD) from the bitstream, and a prediction module that derives a value of a representative MVD corresponding to a value of the coded MVD when a value of the AMVR enable flag is 1, derives a Motion Vector Predictor (MVP) for a current block based on a neighboring block of the current block, derives a Motion Vector (MV) for the current block based on the MVP and the representative MVD, and generates a prediction sample for the current block based on the MV.

According to an embodiment of the present invention, inter prediction of a current block can be efficiently performed while using little additional information. Also, according to an embodiment of the present invention, the bit amount allocated to the Motion Vector Difference (MVD) decreases, and the overall coding efficiency can be increased.

BRIEF DESCRIPTION OF THE DRAWINGS

FIG. 4 is a view illustrating locations of integer and fractional samples for ¼ fractional sample interpolation in inter prediction.

DESCRIPTION OF EXEMPLARY EMBODIMENTS

Figure 1:
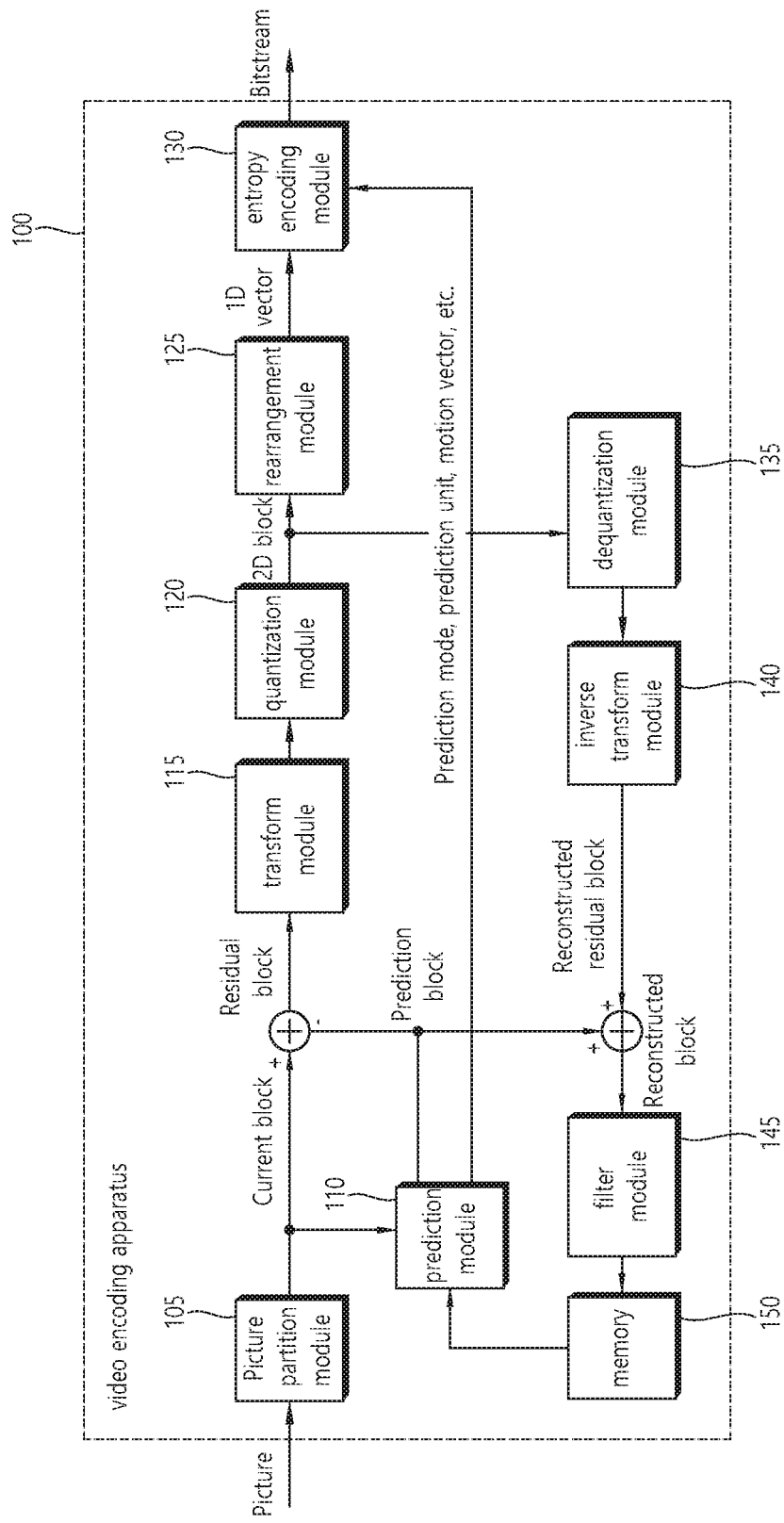
FIG. 1 is a block diagram schematically illustrating a video encoding apparatus according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding apparatus according to an embodiment of the invention.

Referring to FIG. 1, a video encoding apparatus 100 includes a picture partition module 105, a prediction module 110, a transform module 115, a quantization module 120, a rearrangement module 125, an entropy encoding module 130, a dequantization module 135, an inverse transform module 140, a filtering module 145, and a memory 150.

The picture partitioning module 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Furthermore, the TU may be split into a quad tree structure from the CU.

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block including a prediction sample or a prediction sample array. In the prediction module 110, the processing unit of a picture may be a CU, a TU, or a PU. The prediction module 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized Pixels, pels, and samples may be used interchangeably herein.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MVD, the motion vector predictor MVP, residual signal, etc., may be entropy encoded and then transmitted to the decoder. When the skip mode is applied, the prediction block may be used as a reconstruction block, such that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample according to the intra prediction mode and/or the size of a current block.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process according to the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may be configured to entropy code the symbol according to a probability distribution based on the quantized transform values rearranged by the rearrangement module 125 or the encoding parameter value calculated during the encoding process, etc. and then to output a bitstream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoding apparatus and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Furthermore, the residual signal may mean a difference between an original signal and a prediction signal. Furthermore, the difference between the original signal and the prediction signal may be transformed to define the residual signal, or the difference between the original signal and the prediction signal may be transformed and quantized to define the residual signal. The residual signal can be called the residual block in the block unit and the residual signal can be called the residual sample in the sample unit.

When the entropy encoding is applied, the symbols may be expressed such that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoding module 130 may store therein a table for performing entropy encoding, such as a variable length coding/code (VLC) table. The entropy encoding module 130 may perform entropy encoding using the stored VLC table. Furthermore, the entropy encoding module 130 derives a binarization method of a corresponding symbol and a probability model of a corresponding symbol/bin, and then performs entropy encoding using the derived binarization method or probability model.

The entropy encoding module 130 may give a predetermined change to a parameter set or syntaxes to be transmitted, if necessary.

The dequantization module 135 dequantizes the values transform coefficients quantized by the quantization module 120. The inverse transform module 140 inversely transforms the values dequantized by the dequantization module 135.

The residual value or residual sample or residual sample array generated by the dequantization module 135 and the inverse-transform module 140, and the prediction block predicted by the prediction module 110 may be combined to form a reconstructed block including a reconstructed sample or a reconstructed sample array.

In FIG. 1, a residual block and a prediction block are added to create a reconstructed block by an adder. At this time, the adder may be considered as a particular module reconstructed block creating module that creates a reconstructed block.

The filtering module 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering module 145 may not perform a filtering operation on the reconstructed block used in the inter prediction.

The memory 150 may store the reconstructed block or picture calculated by the filtering module 145. The reconstructed block or picture stored in the memory 150 may be supplied to the prediction module 110 that performs the inter prediction.

Figure 2:
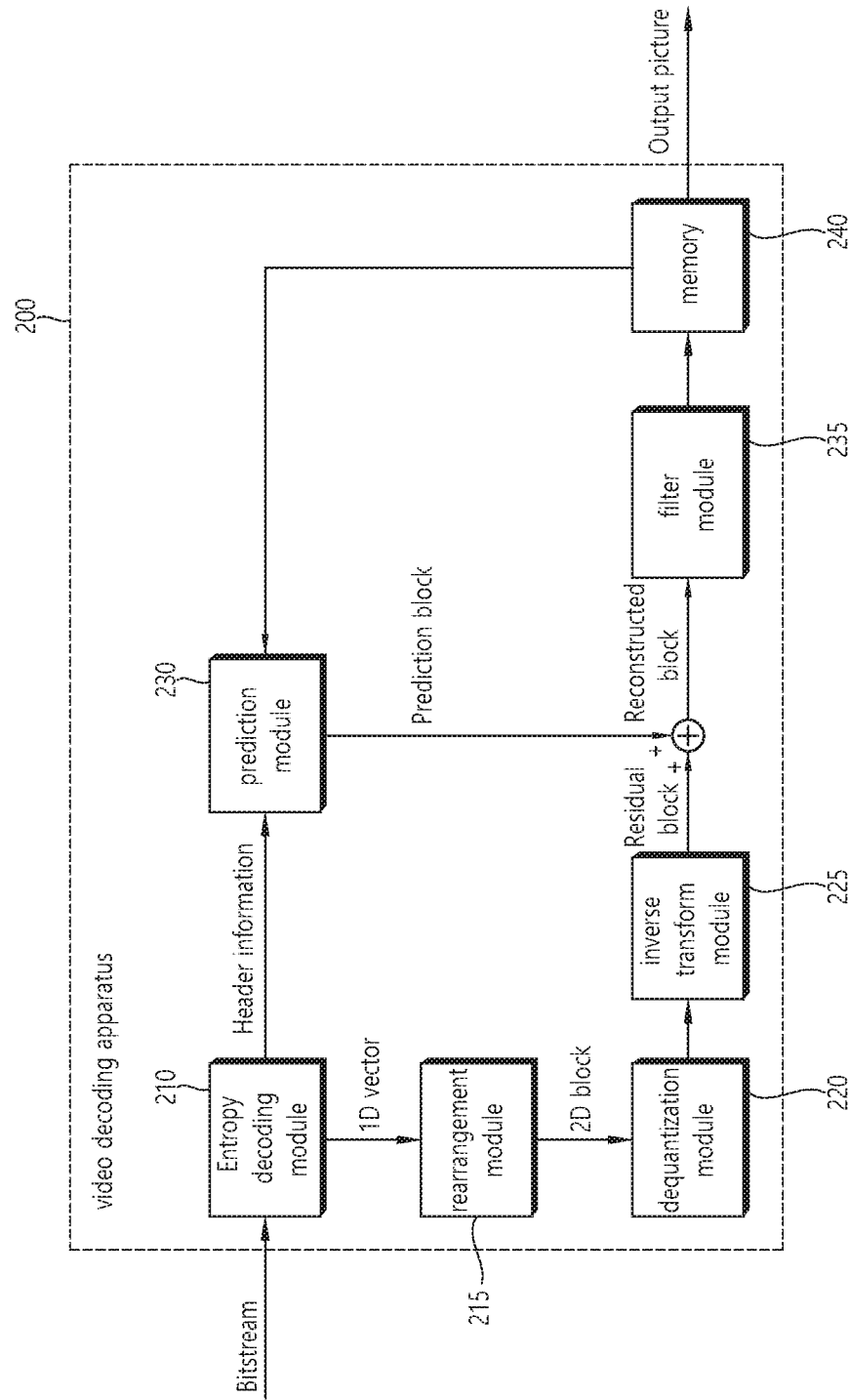
FIG. 2 is a block diagram schematically illustrating a video decoding apparatus according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filtering module 235, and a memory 240.

When a video bitstream is input from the video encoding apparatus, the input bitstream may be decoded on the basis of the order in which video information is processed by the video encoding apparatus.

The entropy decoding module 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding apparatus, the entropy decoding module 210 may perform decoding using the same VLC table as the encoding apparatus used in the encoding apparatus. Furthermore, when CABAC is used to perform entropy encoding in a video encoding apparatus, the entropy decoding module 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoding apparatus.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block transform block and the size of the transform block and may create an array of coefficients quantized transform coefficients in the form of a two-dimensional block.

The dequantization module 220 may perform dequantization on the basis of the quantization parameters supplied from the video encoding apparatus and the coefficient values of the rearranged block.

The inverse transform module 225 may perform the inverse DCT and/or inverse DST of the DCT and/or DST, which has been performed by the transform module of the video encoding apparatus, on the quantization result from the video encoding apparatus.

The inverse transform may be performed on the basis of a transfer unit or a partition unit of a picture determined by the video encoding apparatus. The transform module of the video encoding apparatus may selectively perform the DCT and/or DST according to plural information pieces such as the prediction method, the size of a current block, and the prediction direction, and the inverse transform module 225 of the video decoder may perform the inverse transform on the basis of the transform information on the transform performed by the transform module of the video encoding apparatus.

The prediction module 230 generates a prediction block including a prediction sample or a prediction sample array based on the prediction block generation-related information provided by the entropy decoding module 210 and the previously decoded block and/or picture information provided from the memory 240.

If the prediction mode for the current PU is the intra prediction mode, the prediction module 230 may perform the intra prediction to generate a prediction block based on pixel information in the current picture.

If the prediction mode for the current PU is the inter prediction mode, the prediction module 230 may be configured to perform inter prediction on a current PU based on information included in at least one picture of a previous picture or a subsequent picture to the current picture. In this connection, information about the motion information necessary for inter prediction of the current PU provided in the video encoding apparatus, such as motion vector and reference picture index may be deduced via checking the skip flag and merge flag received from the encoding apparatus.

The prediction module 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In one example, when a merge mode is applied, the encoding apparatus and the decoding apparatus may generate a merge candidate list using the motion vector of the reconstructed spatial neighboring block and/or the motion vector corresponding to the Col block which is a temporal neighboring block. In the merge mode, the motion vector of the candidate block selected in the merge candidate list is used as the motion vector of the current block. The encoding apparatus may transmit a merge index indicating a candidate block having an optimal motion vector selected from the candidate blocks included in the merge candidate list to the decoding apparatus. In this case, the decoding apparatus may derive the motion vector of the current block using the merge index.

In another example, when the AMVP (Advanced Motion Vector Prediction) mode is applied, the encoding apparatus and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding apparatus may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoding apparatus may obtain the motion vector difference MVD between the motion vector for the current block and the motion vector predictor, encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Furthermore, the encoding apparatus may transmit a reference picture index indicating a reference picture to the decoder.

The decoder may predict the motion vector of the current block using the motion information of the neighboring block and derive the motion vector of the current block using the residual received from the encoding apparatus. The decoder may generate the prediction block for the current block based on the derived motion vector and the reference picture index information received from the encoding apparatus.

In another example, when the merge mode is applied, the encoding apparatus and decoder may generate a merge candidate list using the motion information of the reconstructed neighboring block and/or the motion information of the Col block. That is, when the reconstructed neighboring block and/or the motion information of the Col block exists, the encoding apparatus and decoder may use the reconstructed neighboring block and/or the motion information of the Col block as a merge candidate for the current block.

The encoding apparatus may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoding apparatus to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoding apparatus does not transmit syntax information such as the residual to the decoder in addition to information indicating which blocks motion information to use as the motion information for the current block.

The encoding apparatus and the decoder may generate a prediction block of the current block by performing motion compensation on the current block based on the derived motion information. In this connection, a prediction block may refer to a motion-compensated block as generated by performing motion compensation on the current block. Furthermore, a plurality of motion compensated blocks may constitute a single motion compensated image.

The reconstructed block may be generated using the prediction block generated by the prediction module 230 and the residual block provided by the inverse-transform module 225. FIG. 2 illustrates that using the adder, the prediction block and the residual block are combined to generate the reconstructed block. In this connection, the adder may be viewed as a separate module (a reconstructed block generation module) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

When the skip mode is used for a block, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoding module 210, the rearrangement module 215, the dequantization module 220, the inverse transform module 225, the prediction module 230, the filtering module 235 and the memory 240 which are included in the decoding apparatus 200, for example, the entropy decoding module 210, the rearrangement module 215, the dequantization module 220, the inverse transform module 225, the prediction module 230, the filtering module 235, and so on may be expressed as a decoder or a decoding unit that is distinguished from other elements.

In addition, the decoding apparatus 200 may further include a parsing unit not shown in the drawing that parses information related to the encoded images included in a bitstream. The parsing unit may include the entropy decoding module 210, and may be included in the entropy decoding module 210. Such a parsing unit may also be implemented as an element of the decoding unit.

Figure 3:
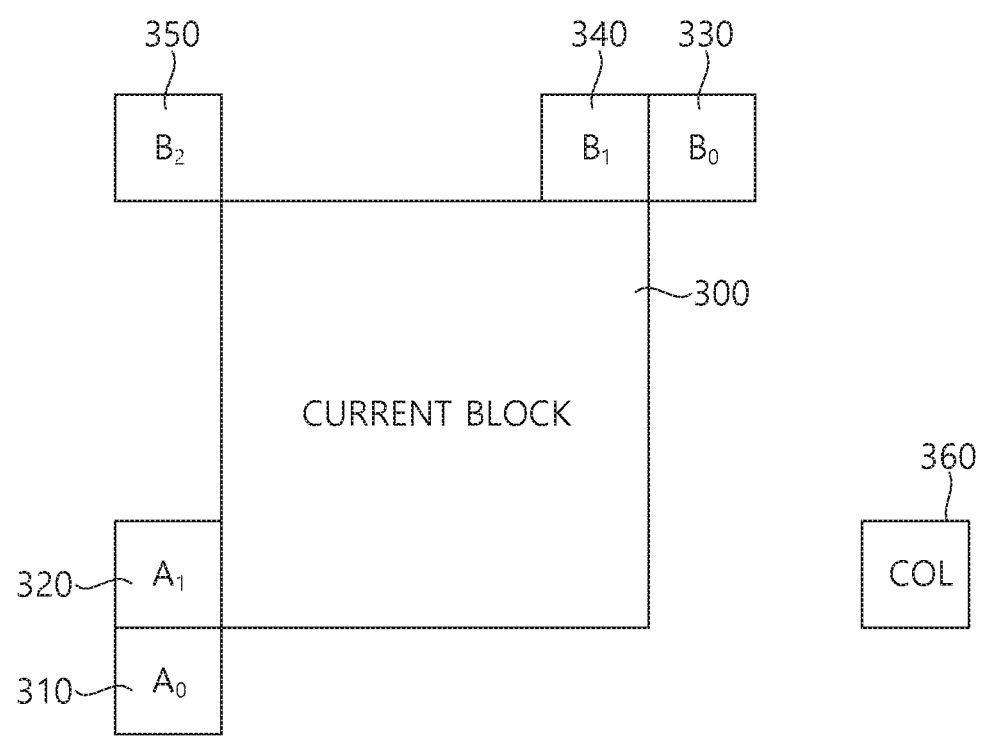
FIG. 3 is a schematic view illustrating one embodiment of a candidate block that is usable when inter prediction is performed on a current block.

FIG. 3 is a schematic view illustrating one embodiment of a candidate block that is usable when inter prediction is performed on a current block. Here, the current block may be a prediction block.

The prediction modules of the encoding apparatus and the decoding apparatus may use a reconstructed neighboring block at a predetermined position around the current block 300 as a candidate block. For example, in the example of FIG. 3, two blocks A0 310 and A1 320 located on the left side of the current block and three blocks B0 330, B1 340 and B2 350 located on the upper side of the current block may be selected as spatial candidate blocks. Here, A0 310 may be referred to as a lower left neighboring block, and A1 320 may be referred to as a left neighboring block. In addition, B0 330 may be referred to as an upper right neighboring block, B1 340 may be referred to as an upper neighboring block, and B2 350 may be referred to as an upper left neighboring block.

In addition to the spatially neighboring blocks, the above-described Col block 360 may be used as a temporal candidate block. The Col block 360 may be referred to as a Col prediction block (ColPb), and may be a block corresponding to the current block in a collocated picture, which is one of the reconstructed reference pictures and may be a block existing at a certain relative position (e.g., at a position which is arithmetically shifted according to a certain criteria from the lower right neighboring sample position or the center lower right sample position of a block existing at the same position as the current block in the Col picture).

Specifically, in the AMVP mode, an optimal MVP for the current block is selected from an MVP candidate list including Motion Vector Predictor (MVP) candidates derived from the candidate blocks. In this case, the encoding apparatus performs motion estimation to derive an optimal MVP from the MVP candidate list based on the derived MV of the current block, and calculates an MVD obtained by subtracting the MVP from the MV. The encoding apparatus encodes MVP index information indicating which MVP candidate among the MVP candidates included in the MVP candidate list is the MVP for the current block and MVD information indicating the x axis value and the y axis value of the obtained MVD, and transmits the encoded information to the decoding apparatus through bitstream.

The decoding apparatus may derive the MVP for the current block from the MVP candidate list based on the MVP index information and MVD information transmitted from the encoding apparatus, and may derive the MV of the current block by adding the MVD to the derived MVP. A reference block on the reference picture is derived based on the MV of the current block, and the reference block may be used as a prediction block for the current block. That is, the samples in the reference block may be used as prediction samples for the current block. The decoding apparatus may receive information on residual samples from the encoding apparatus to generate the residual samples. The information on the residual samples may include information on the transform coefficients. Specifically, for example, the decoding apparatus may receive the transform coefficients from the encoding apparatus through the bitstream, and invert the transform coefficients to generate a residual block (or residual samples). Here, the residual sample may represent a difference between the original sample and the prediction sample, and the residual block may represent a difference between the original block including the original samples and the prediction block including the prediction samples.

The motion vector may have a sample resolution of less than or equal to integer units. For example, the motion vector may have a ¼ sample resolution for a luma component. Accordingly, a reference block that is more similar to the current block may be indicated by generating a ¼ unit fractional sample from an integer sample or a full sample through interpolation on a reference picture, and selecting a reference block in a region including a fractional sample.

The fractional sample of less than or equal to integer units may be generated through an interpolation filter based on the integer sample. As described above, in the case of luma component sample (hereinafter, referred to as a luma sample), the resolution of the motion vector is a ¼ fractional sample, and the encoding apparatus and the decoding apparatus may generate sample information of less than or equal to integer unit by ¼ sample unit through interpolation. For example, in order to perform interpolation for the luma sample, an 8-tap interpolation filter with different filter coefficients may be used.

Figure 4:
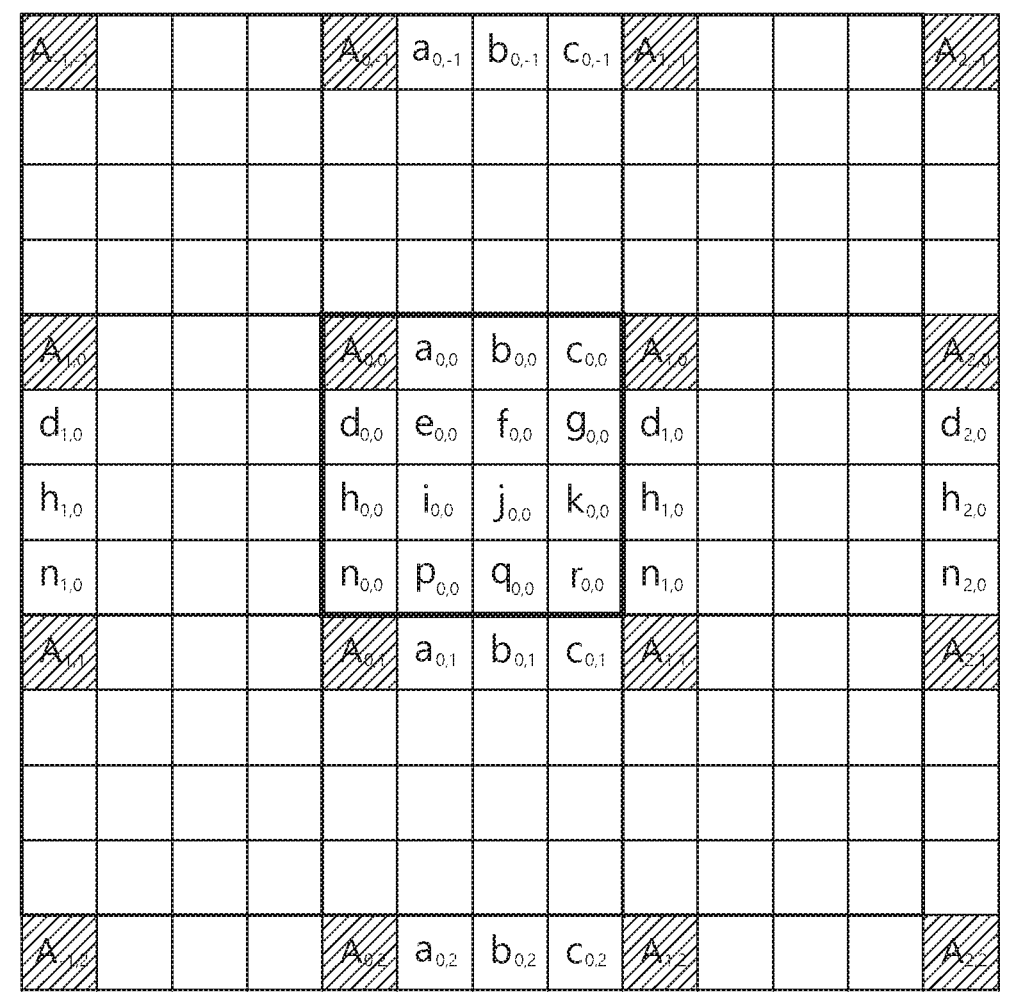

FIG. 4 is a view illustrating locations of integer and fractional samples for ¼ fractional sample interpolation in inter prediction. Among the positions of the samples shown in FIG. 4, shaded positions (or marked by uppercase) correspond to integer samples, and non-shaded positions (or marked by lowercase) correspond to fractional samples.

Table 1 below shows an example of filter coefficients according to the sample position. For example, the filter coefficients may be applied to samples of luma components.

TABLE 1

| Sample Position | Filter Coefficient |
|---|---|
| 1/4 | {−1, 4, −10, 58, 17, −5, 1, 0} |
| 2/4 | {−1, 4, −11, 40, 40, −11, 4, −1} |
| 3/4 | {0, 1, −5, 17, 58, −10, 4, −1} |

For example, the fractional samples of FIG. 4 may be derived by applying an 8-tap filter based on the filter coefficients.

Thus, the reference block is detected in the fractional sample unit, and the MV of the fractional sample unit is derived, such that the inter prediction can be more precisely performed. In this case, the amount of data allocated to the residual signal may be reduced. In this case, however, MVD also needs to be indicated in fractional sample units, and the amount of data allocated to MVD relatively increases.

On the other hand, the coding efficiency may be improved by adaptively adjusting the range or resolution of the motion vector. This may be referred to as an Adaptive Motion Vector Range (AMVR), and the MV may also be determined by a ½ fractional sample (or half sample) unit or an integer sample unit in order to reduce side information. In this case, a uniform fractional sample unit or integer sample unit or the like may be used in the entire range, or the range of the sample unit may be differently set adaptively according to the region. The former may be referred to as a linear AMVR, and the latter may be referred to as a non-linear AMVR.

A method of deriving MV based on AMVR is as follows.

Figure 5:
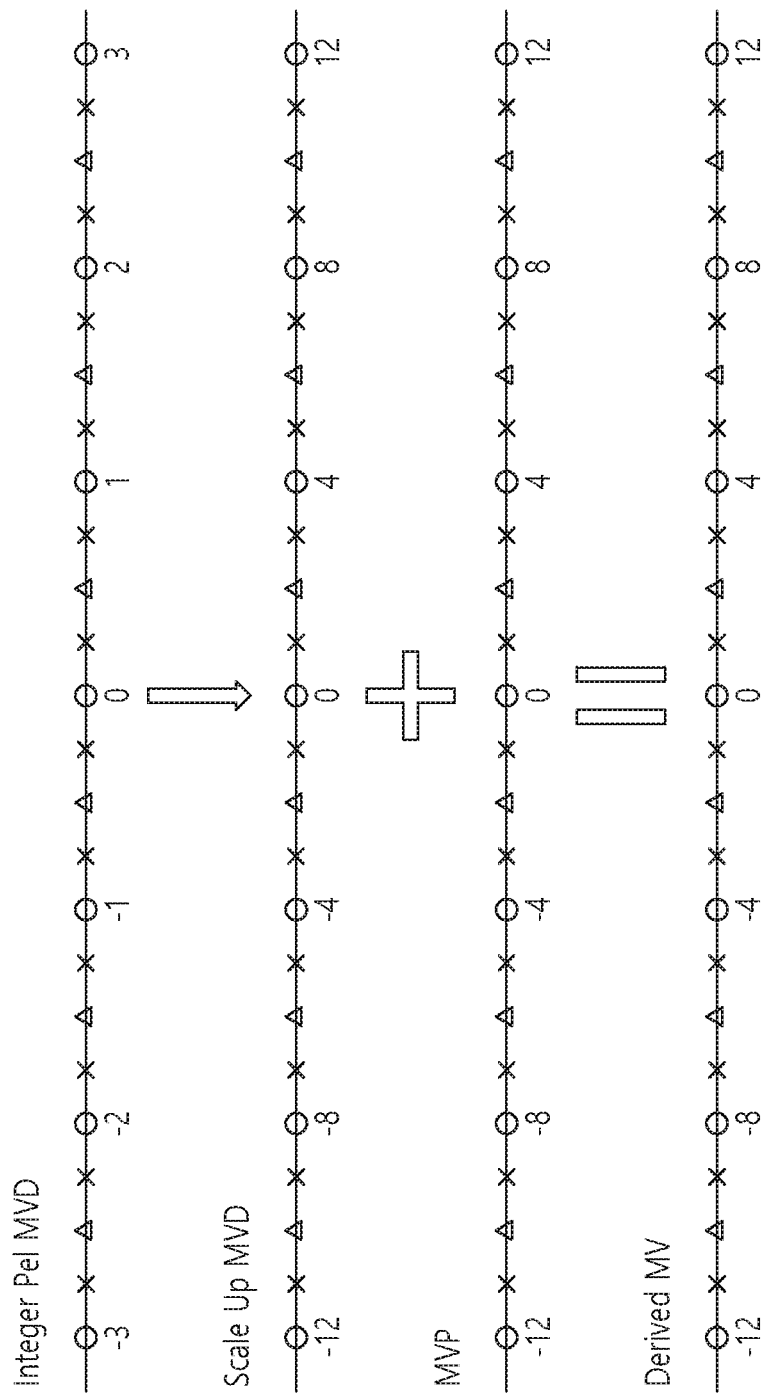
FIG. 5 is a view illustrating an example of a method of deriving an MV based on AMVR.

FIG. 5 is a view illustrating an example of a method of deriving an MV based on AMVR. The method disclosed in FIG. 5 may be performed by a decoding apparatus.

Referring to FIG. 5, the decoding apparatus derives one MVP from the MVP candidate list constituted based on the spatial neighboring blocks and the temporal corresponding block of the current block. Here, MVP may be the MV of one of the spatial neighboring blocks and the temporal corresponding block, and thus may be originally a ¼ fractional-pel unit. The decoding apparatus derives an MVP of integer-pel unit through a rounding procedure.

The MVD may be received in integer-pel unit, and in this case, the decoding apparatus scales up the received MVD. The decoding apparatus scales up the value of the MVD to distinguish the value of the MVD unit from the ¼ fractional-pel unit and thus derives the MVD of integer-pel unit. That is, the value 1 of the MVD of the ¼ pel unit may represent ¼ fractional pel, and the value 4 may represent 1 integer-pel. The decoding apparatus may allow the value 1 of the MVD of the integer-pel unit to represent 1 integer-pel and allow the value 4 to represent 4 integer-pel through the scale-up.

The decoding apparatus derives the MV of the integer-pel unit based on the MVP of the integer-pel unit and the MVD of the integer-pel unit. In this case, the decoding apparatus may derive the MV of the integer-pel unit by adding the MVP of the integer-pel unit and the MVD of the integer-pel unit. As described above, a pixel, a pel, and a sample may be used interchangeably with each other in this disclosure.

On the other hand, the encoding apparatus searches for a sample position having an optimal Rate-Distortion (RD) cost through motion estimation to determine a first (temporary) MV. In this case, the first MV may be a MV of fractional-pel unit. The encoding apparatus generates an AMVP candidate list in the same manner as the decoding apparatus and derives a first MVP. In this case, the first MVP may be a fractional-pel unit. The encoding apparatus rounds off the first MVP to derive a second MVP of integer-pel unit.

The encoding apparatus generates a first MVD based on a difference value between the first MV and the first MVP, and then rounds the first MVD to derive a second MVD of integer-pel unit.

The encoding apparatus derives a second MV of integer-pel unit based on the addition of the second MVP and the second MVD.

The encoding apparatus compares an RD cost based on the first MV and an RD cost based on the second MV, and selects a mode having a better RD cost (i.e., lower RD cost). In this case, a mode for performing prediction based on the first MV may be referred to as a normal mode, and a mode for performing prediction based on the second MV may be referred to as an AMVR mode.

That is, AMVR is a method of representing MV in integer-pel unit and reducing the absolute size (i.e., bit amount) of MVD to be coded. The MVD may be transmitted, for example, via a syntax as shown in Table 2 below. The syntax may be included in a bitstream to be transmitted.

TABLE 2

| mvd_coding( x0, y0, refList ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
|   abs_mvd_greater1_flag[ 0 ] | ae(v) |
| if( abs_mvd_greater0_flag[ 1 ] ) | |
|   abs_mvd_greater1_flag[ 0 ] | ae(v) |
| if( abs_mvd_greater0_flag[ 0 ] ) { | |
|   if( abs_mvd_greater1_flag[ 0 ] ) | |
|     abs_mvd_minus2[ 0 ] | ae(v) |
|   mvd_sign_flag[ 0 ] | ae(v) |
| } | |
| if( abs_mvd_greater0_flag[ 1 ] ) { | |
|   if( abs_mvd_greater1_flag[ 1 ] ) | |
|     abs_mvd_minus2[ 1 ] | ae(v) |
|   mvd_sign_flag[ 1 ] | ae(v) |
| } | |
| } | |

Referring to Table 2, abs_mvd_grater0_flag [0/1] indicates whether the absolute values of the x component/y component of the motion vector difference are larger than 0.

abs_mvdgrater1_flag [0/1] indicates whether the absolute values of the x component/y component of the motion vector difference are larger than 1. abs_mvd_grater1_flag [0/1] may be transmitted/received and parsed when abs_mvd_grater0_flag [0/1] is true (that is, when the value of abs_mvdgrater0_flag [0/1] is 1).

A value obtained by adding 2 to abs_mvd_minus2 [0/1] represents the absolute value of the x component/y component of the motion vector difference. abs_mvd_minus2 [0/1] may be transmitted/received and parsed when abs_mvd_grater1_flag [0/1] is true (that is, when the value of abs_mvd_grater1_flag [0/1] is 1).

mvd_sign_flag [0/1] indicates the sign of the x component/y component of the motion vector difference. When the value of mvd_sign_flag [0/1] is 0, the x component/y component of the corresponding motion vector difference has a positive value. When the value of mvd_sign_flag [0/1] is 1, the x component/y component of the corresponding motion vector difference has a negative value. mvd_sign_flag [0/1] may be transmitted/received and parsed when abs_mvd_grater0_flag [0/1] is true (i.e. when the value of abs_mvd_grater0_flag [0/1] is 1).

When AMVR is applied, since MVD can be expressed in an integer-pel unit using the syntax elements as described above, the absolute value of MVD can be reduced and thus the transmitted bits can be reduced.

Also, according to an embodiment of the present invention, a non-linear MV range may be applied in order to further increase the bit saving effect. According to an embodiment of the present invention, the energy compaction is increased by using an integer-pel unit or above unit in a range where the correlation of the predicted values is high. Also, by adaptively representing up to half-pel and quarter-pel positions according to the range as well as the integer-pel in a range where the correlation of the predicted values is relatively low, a bit saving effect can be achieved while maintaining the accuracy of the prediction.

Example 1

A first embodiment of the present invention provides a method capable of performing more efficient bit transmission by efficiently performing the energy compaction of the MVD while maintaining the linear MVD range.

Figure 6:
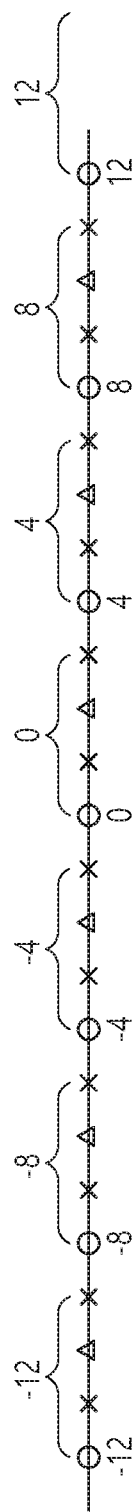
FIG. 6 is a view illustrating an AVMR method having a linear range.

FIG. 6 is a view illustrating an AVMR method having a linear range.

Referring to FIG. 6, the linear MVD range may be based on a method of rounding down an MVD value of qualter-pel unit to a multiple of 4 and then scaling down the MVD value to 4. In this case, for example, an MVD of the quarter-pel unit having a value of −4 to −1 becomes an MVD of the integer-pel unit having a value of −1, and an MVD of the quarter-pel unit having a value of 0 to 3 becomes an MVD of the integer-pel unit having a value of 0. Also, an MVD of the quarter-pel unit having a value of 4 to 7 becomes an MVD of the integer-pel unit having a value of 1.

Meanwhile, in the MVD-related syntax as described in Table 2, it is checked whether or not the size of the absolute value of the MVD is larger than 0, and when the size of the absolute value of the MVD is not larger than 0, the abs_mvd_grater0_flag 1 bit having a value of 0 is transmitted. On the other hand, when the size of the absolute value of the MVD is larger than 0, it is further checked whether or not the size of the absolute value of the MVD is larger than 1. When not larger than 1, the abs_mvd_grater1_flag 1 bit having a value of 0 is additionally transmitted. On the other hand, when both of the above cases are not satisfied (that is, when the MVD is equal to or larger than 2), a value obtained by subtracting 2 from the absolute value of the MVD is coded on the basis of a primary exponential golomb. For this reason, when the range is biased to a positive number as shown in FIG. 6, there is an imbalance that the coding efficiency varies according to whether the value of the MVD is positive or negative. For example, when the value of the MVD of the quarter-pel unit is 3, the value needs to be represented by 0 and a value 0 scaled down by 4 units needs to be indicated. Accordingly, the encoding apparatus transmits abs_mvd_grater0_flag 1 bit having a value of 0. However, if the value of the MVD of the quarter-pel unit is −3, the value is represented as −4 and a value −3 scaled down by 4 units needs to be indicated. In this case, the encoding apparatus needs to transmit a total of 2 bits of abs_mvd_grater0_flag 1 bit having a value of 1 and abs_mvd_grater1_flag 1 bit having a value of 0. In order to solve such an imbalance, a balanced linear range may be used as shown in FIG. 7.

Figure 7:
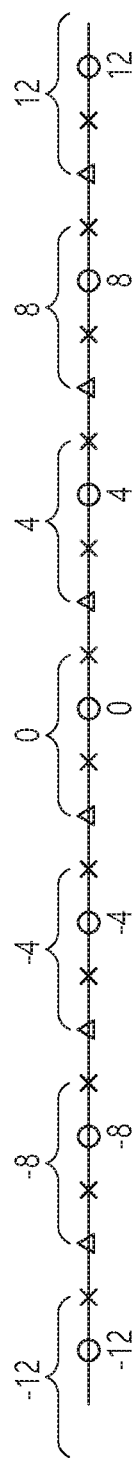
FIG. 7 is a view illustrating an AVMR method having a balanced linear range.

FIG. 7 is a view illustrating an AVMR method having a balanced linear range.

Referring to FIG. 7, the balanced linear MVD range may be based on a method of rounding down an MVD value of the quarter-pel unit plus 2 to a multiple of 4 and then scaling down to 4. That is, in this case, for example, the MVD of the quarter-pel unit having a value of −6 to −3 is represented by a representative value −4 and becomes an MVD of the integer-pel unit having a value of −1, and the MVD of the quarter-pel unit having a value of −2 to 1 is represented by a representative value 0 and becomes an MVD of the integer-pel unit having a value of 0. Also, the MVD of the quarter-pel unit having a value of 2 to 5 having a value of 2 to 5 is represented by a representative value 4 and becomes an MVD of the integer-pel unit having a value of 1. On the other hand, as an example, the balanced linear MVD range may be based on a method of rounding down an MVD value of the quarter-pel unit plus 1 to a multiple of 4 and then scaling down to 4.

By adjusting the linear range used in the AMVR method as described above, it is possible to improve the imbalance that the coding efficiency varies according to whether the MVD value is positive or negative.

Example 2

A second embodiment of the present invention provides a method of reducing the amount of bits to be transmitted by applying the non-linear MVD range instead of the linear MVD range and increasing the usage ratio of abs_mvd_grater0_flag or abs_mvd_grater1_flag.

Figure 8:
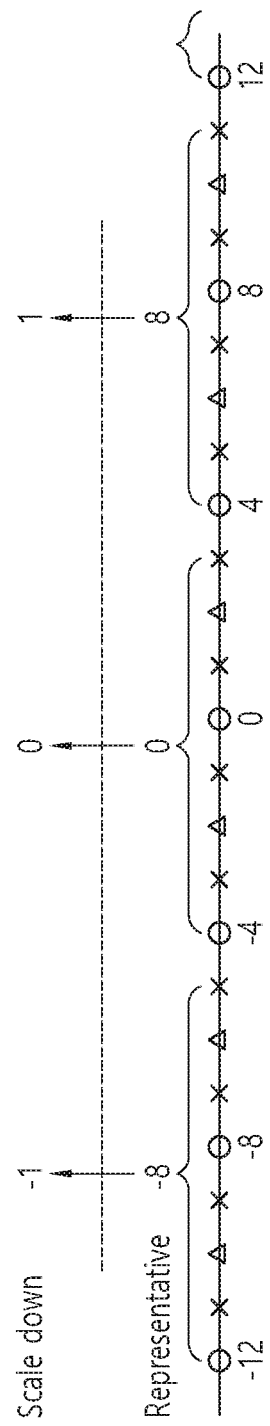
FIG. 8 is a view illustrating an example of an AVMR method having a non-linear range.

FIG. 8 is a view illustrating an example of an AVMR method having a non-linear range.

Referring to FIG. 8, in the non-linear MVD range, a range where MVD values of quarter-pel unit can be scaled down to −1, 0, 1 is based on 8 units, and the remaining range is based on 4 units. That is, the center region may be based on a method of rounding down an MVD value of the quarter-pel unit plus 4 to a multiple of 8 and then scaling down to 8. For example, the MVD of the quarter-pel unit having a value of −12 to −5 is represented by a representative value −8 and is scaled down to become an MVD of the integer-pel unit having a value of −1, and an MVD of the quarter-pel unit having a value of −4 to 3 is represented by a representative value 0 and scaled down to become an MVD of the integer-pel unit having a value of 0. Also, an MVD of the quarter-pel unit having a value of 4 to 11 is represented by a representative value 8 and scaled down to an MVD of the integer-pel unit having a value of 1.

In the case of constructing the non-linear MVD range as described above, the MVDs belonging to the non-linear range are represented by the representative values of the corresponding range, and values after performing the adaptive scaling down according to the ranges are coded and transmitted through the bitstream. In this case, the energy compaction can be improved by increasing the ratio expressed by 0 or 1 of the MVD value to be coded and transmitted.

On the other hand, the non-linear AMVR may be indicated through the non_linear_amvr_range_flag syntax elements as shown in the following Table 3.

TABLE 3 sps_temporal_mvp_enabled_flag
strong_intra_smoothing_enabled_flag
amvr_enable_flag
if( amvr_enable_flag)
  non_linear_amvr_range_flag
vui_parameters_present_flag
if( vui_parameters_present_flag )
  vui_parameters( )
sps_extension_flag TABLE 3-continued if( sps_extension_flag )
  while( more_rbsp_data( ) )
    sps_extension_data_flag
  rbsp_trailing_bits( )
}

Referring to Table 3, amvr_enable_flag indicates whether or not the AMVR mode is available. non_linear_amvr_range_flag indicates whether or not the non-linear AMVR range is applied. The non_linear_amvr_range_flag may be transmitted/received and parsed when the value of the amvr_enable_flag is 1. The syntax disclosed in Table 3 above may be included in, for example, a Sequence Parameter Set (SPS) syntax.

When the value of non_linear_amvr_range_flag is 0, the non-linear AMVR range is not applied. That is, in this case, the linear AMVR range is applied in expressing the MVD. On the other hand, when the value of the non_linear_amvr_range_flag is 1, the non-linear AMVR range may be applied. That is, the decoding apparatus may determine whether or not the non-linear AMVR range is applied based on the non_linear_amvr_range_flag.

Basically, the decoding apparatus knows the non-linear range information and the range representative value information, and when the value of the non-linearamvr_range_flag is 1, a predetermined default non-linear range may be used when there is no other additional information.

Example 3

Furthermore, a third embodiment of the present invention provides a method capable of indicating a specific non-linear AMVR range is provided in addition to the second embodiment of the present invention described above.

As described above, when the value of amvr_enable_flag is 1, it may be indicated whether the linear AMVR range is used or the non-linear AMVR range is used through non_linear_amvr_range_flag.

In the second embodiment described above, a default value of the non-linear range is preset in the decoding apparatus, and the decoding apparatus may use the default non-linear range when the value of non-linear_amvr_range_flag is 1. However, in this embodiment, non-linear AMVR range-related parameters as shown in the following Table 4 may be transmitted to adaptively inform the decoding apparatus of the non-linear AMVR range.

TABLE 4 sps_temporal_mvp_enabled_flag
strong_intra_smoothing_enabled_flag
sps_amvr_enable_flag
if( sps_amvr_enable_flag)
  non_linear_amvr_range_flag
if( amvr_enable_flag && non_linear_amvr_range_flag)
  non_linear_amvr_range_parameters( )
vui_parameters_present_flag
if( vui_parameters_present_flag )
  vui_parameters( )
sps_extension_flag
if( sps_extension_flag )
  while( more_rbsp_data( ) )
    sps_extension_data_flag
  rbsp_trailing_bits( )
}

Here, sps_amvr_enable_flag indicates whether or not the AMVR mode is available. The sps_amvr_enable_flag may be used interchangeably with amvr_enable_flag. non_linear_amvr_range_flag indicates whether or not the non-linear AMVR range is applied. The non_linear_amvr_range_flag may be transmitted/received and parsed when the value of the sps_amvr_enable_flag is 1.

Meanwhile, the non_linear_amvr_range_paramter syntax may be further transmitted/received and parsed/called when the value of the non_linear_amvr_range_flag is 1 (that is, when the value of the sps_amvr_enable_flag is 1 and the value of the non_linear_amvr_range_flag is 1). The non_linear_amvr_range_parameter syntax represents the non-linear AMVR range-related parameters. The non-linear AMVR range-related parameters may be divided into, for example, three ranges to indicate range values according to each position and representative values of the ranges. The non-linear AMVR range-related parameters may include, for example, the following syntax elements.

TABLE 5

```
non_linear_amvr_range_parameters( ) {
  num_non_linear_range_table_candidate
  for(rangeTableIdx=0; rangeTableIdx<
  num_non_linear_range_table_candidate;rangeTableIdx++){
    first_range_value
    first_range_representative_value
    second_range_value
    second_range_representative_value
    third_range_value
    third_range_representative_value
  }
}
```

Here, num_non_linear_range_table_candidate represents the number of non-linear range table candidates. Each non-linear range table candidate may include a first_range_representative_value, a second_range_value, a second_range_representative_value, a third_range_value, and a third_range_representative_value. The encoding apparatus may indicate one of the non-linear range table candidates through a range table index. On the other hand, if one or fixed number of non-linear range tables are used, the num_non_linear_range_table_candidate may be omitted.

The first_range_value, the second_range_value, and the third_range_value represent a first range value, a second range value, and a third range value centered at 0, respectively. Here, the first range is a range including 0. The first_range_value, the second_range_value, and the third_range_value may each represent a value of 0 or more.

In addition, first_range_representative_value, second_range_representative_value and third_range_representative_value each represent representative values of the related range.

For example, when the value of the first_range_value is a and the value of the first_range_representative_value is 0, the range (including 0) of −a≤MVD<a becomes the first range, and a representative value of the first range is 0. Also, when the value of the second_range_value is b and the value of the second_range_representative_value is m, −b≤MVD<−a and a≤MVD<b become the second ranges, and the representative values of the second range become −m and m, respectively. When the value of the third_range_value is c and the value of the third_range_representative_value is n, −c≤MVD<−b and b≤MVD<c are the third ranges, and the representative values of the third range are −n and n, respectively.

Figure 9:
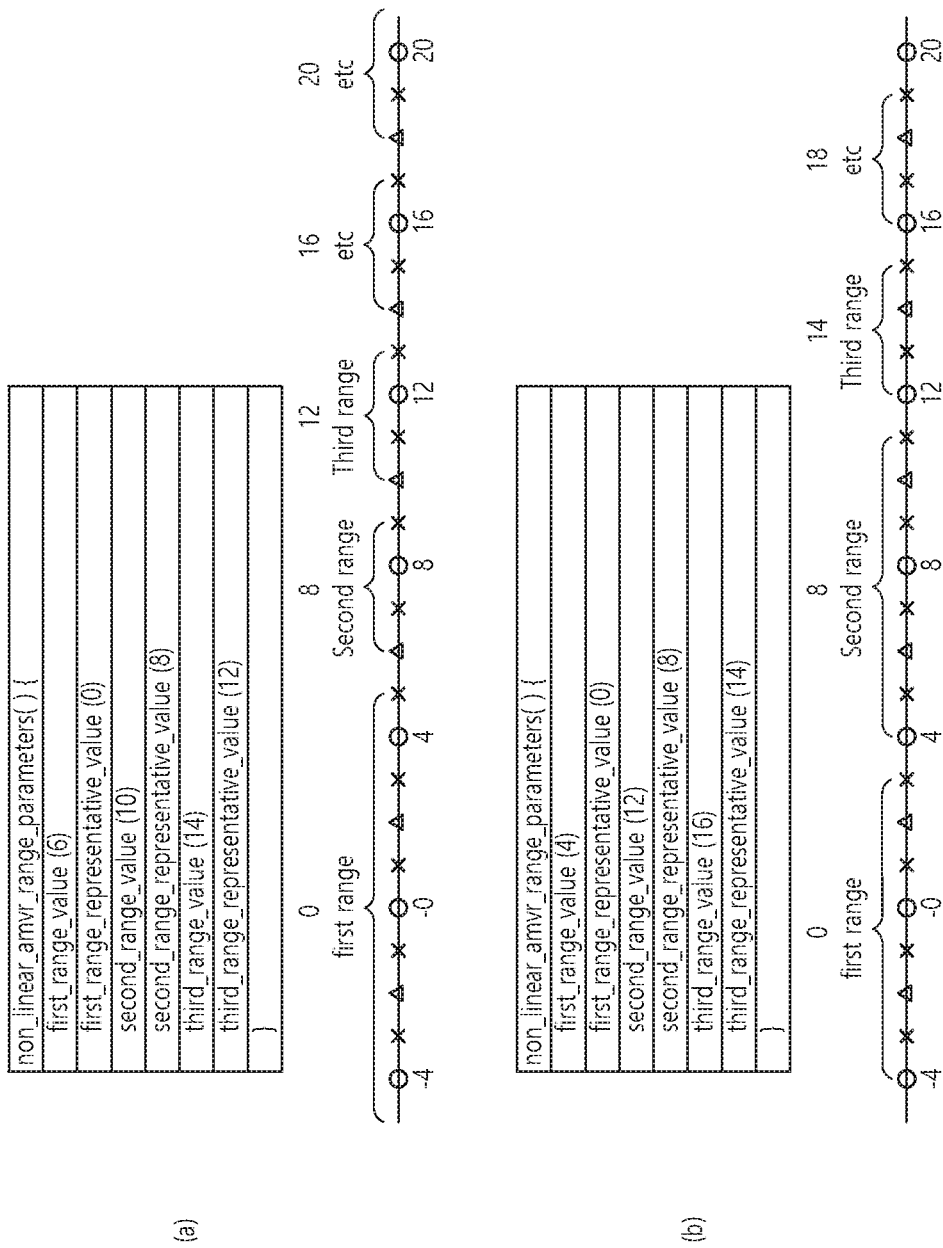
FIG. 9 is a view illustrating an example of constructing a non-linear AMVR by parsing a non-linear AVMR range parameter syntax according to an embodiment of the present invention.

FIG. 9 is a view illustrating an example of constructing a non-linear AMVR by parsing a non-linear AVMR range parameter syntax according to an embodiment of the present invention. In FIG. 9, a positive number domain is mainly shown and described in order to avoid duplication of description.

Referring to FIG. 9A, the value of the first_range_value is 6, the value of the first_range_representative_value is 0, the value of the second_range_value is 10, the value of the second_range_representative_value is 8, the value of the third_range_value is 14, and the value of the third_range_representative_value is 12. In this case, the first range is −6≤MVD<6, and the representative value for the first range is 0. The second range of the positive number domain is 6≤MVD<10, and the representative value for the second range is 8. The third range of the positive number domain is 10≤MVD<14, and the representative value for the third range is 12. The representative values for the first to third ranges may be scaled down to correspond to 0, 1, and 2, respectively. In this case, a non-linear AMVR range may be derived as shown in FIG. 9A. On the other hand, the parts denoted by "etc" (for example, ranges 13 to 17) indicate residual ranges outside the first to third ranges, and the residual ranges may be set according to predefined criteria.

Referring to FIG. 9B, the value of the first_range_value is 4, the value of the first_range_representative_value is 0, the value of the second_range_value is 12, the value of the second_range_representative_value is 8, the value of the third_range_value is 16, and the value of the third_range_representative_value is 14. In this case, the first range is −4≤MVD<4, and the representative value for the first range is 0. The second range of the positive number domain is 4≤MVD<12, and the representative value for the second range is 8. The third range of the positive domain is 12≤MVD<16, and the representative value for the third range is 14. The representative values for the first to third ranges may be scaled down to correspond to 0, 1, and 2, respectively. In this case, a non-linear AMVR range may be derived as shown in FIG. 9A.

When there are a plurality of non-linear range table candidates as described above, the encoding apparatus may indicate one of the candidates based on a range table index, and the decoding apparatus may receive and parse the range table index to select one of the candidates. For example, the range table index may be transmitted through the following syntax.

TABLE 6

```
slice_segment_header( ) {
  first_slice_segment_in_pic_flag
  if( nal_unit_type >= BLA_W_LP && nal_unit_type <=
  RSV_IRAP_VCL23 )
    no_output_of_prior_pics_flag
  slice_pic_parameter_set_id
  ...
        delta_poc_msb_present_flag[ i ]
        if( delta_poc_msb_present_flag[ i ] )
          delta_poc_msb_cycle_lt[ i ]
      }
    }
    if( sps_temporal_mvp_enabled_flag )
      slice_temporal_mvp_enabled_flag
    if( sps_non_linear_amvr_range_flag)
      slice_non_linaer_amvr_range_table_idx
  }
  ...
}
```

Here, slice_non_linear_ambr_range_table_jdx may represent the above-described range table index. The slice_non_linear_ambr_range_table_jdx may be transmitted/received and parsed when the value of the non_linear_amvr_range_flag (or sps_non_linear_amvr_flag) described in Table 4 is 1.

The slice_non_linear_ambr_range_table_jdx may be transmitted at a slice header end. That is, the slice_non_linear_ambr_range_table_idx syntax element may be transmitted through a slice segment header syntax for the slice including a current block. Here, the current block may be PU or PB.

The decoding apparatus may derive the MVD based on the range values for the non-linear range table candidate corresponding to an index indicated by the slice_non_linear_ambr_range_table_jdx.

Example 4

In addition, in a fourth embodiment of the present invention, as an extension of the third embodiment described above, the expression unit of the MVD may be adaptively changed according to the range. In this case, the expression unit of the MVD may be adaptively changed to integer-pel unit, half-pel unit, or quarter-pel unit.

Figure 10:
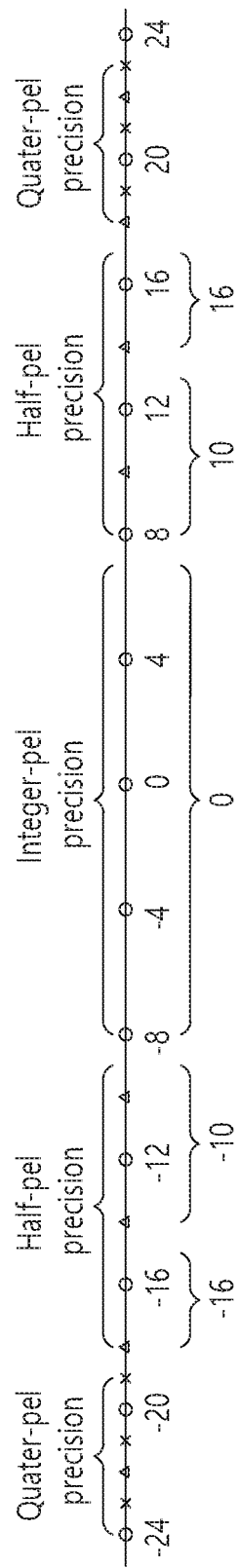
FIG. 10 is a view illustrating an example of a non-linear AMVR method having an adaptive MVD precision.

FIG. 10 is a view illustrating an example of a non-linear AMVR method having an adaptive MVD precision.

Referring to FIG. 10, the range of −8≤MVD<8 has an integer-pel precision, the ranges of −18≤MVD<−8 and the range of 8≤MVD<18 have a half-pel precision, and the range of −24≤MVD<−18 and the range of 18≤MVD<24 are set to have a quarter-pel precision. In this case, the encoding apparatus may derive an MVD with integer-pel precision within the range of −8≤MVD<8, may derive an MVD with half-pel precision within the range of −18≤MVD<−8 and 8≤MVD<18, and may derive an MVD with quarter-pel precision within the range of −24≤MVD<−18 and the range of 18≤MVD<24. Thus, the encoding apparatus may estimate and express in the unit of the integer-pel when the predicted MV according to the distortion and rate relationship in the RD optimization process belongs to a range where the correlation is high, thereby reducing the bit amount of the MVD. On the contrary, when the predicted MV belongs to a range where the correlation is low, the encoding apparatus may estimate and express in a lower unit (e.g., half-pel or quarter-pel unit), thereby further reducing the distortion.

Figure 11:
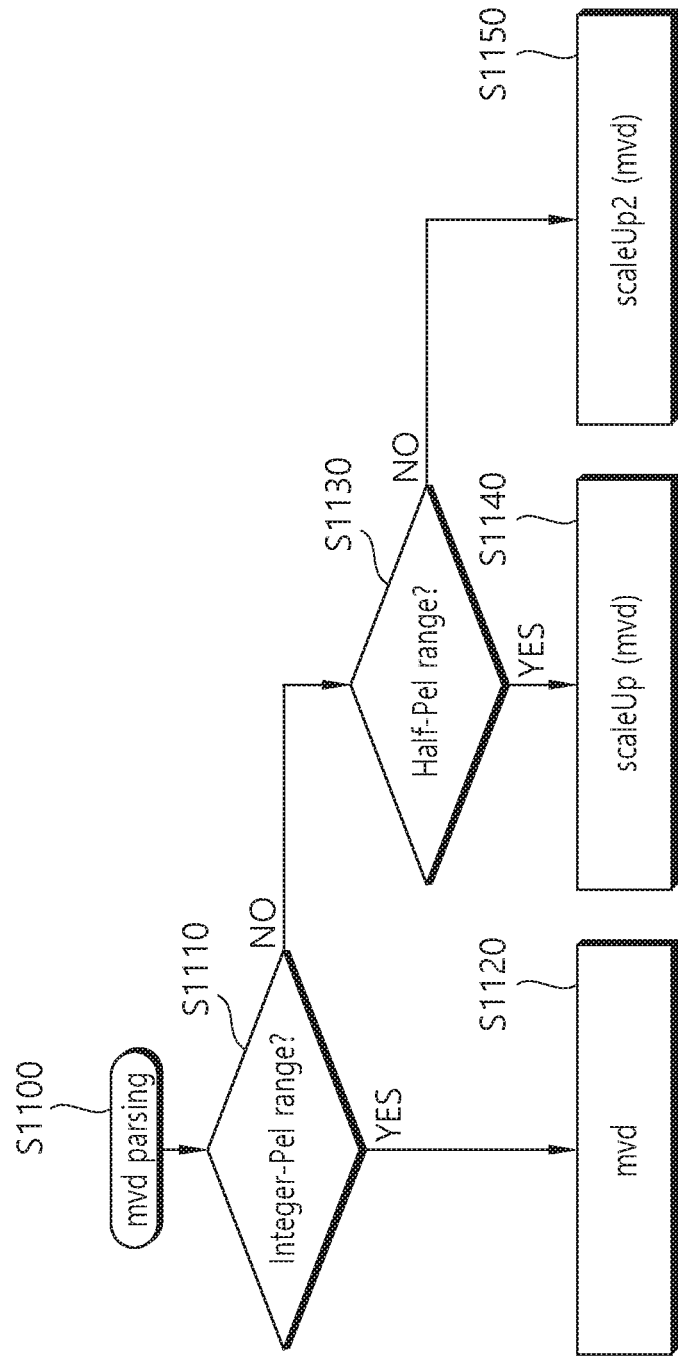
FIG. 11 is a view illustrating a method for deriving an MVD according to an adaptive MVD precision according to an embodiment of the present invention.

FIG. 11 is a view illustrating a method for deriving an MVD according to an adaptive MVD precision according to an embodiment of the present invention. The method of FIG. 11 may be performed by a decoding apparatus.

Referring to FIG. 11, the decoding apparatus parses the MVD (S1100). Here, the parsing of the MVD includes receiving and parsing the MVD-related syntax.

The decoding apparatus check whether or not the MVD has an integer-pel precision based on a range to which the coded value of the MVD belongs (S1110).

When the MVD has an integer-pel precision in operation S1110, the decoding apparatus derives a representative value for the coded value of the MVD in consideration of the integer-pel precision (S1120)

If the MVD does not have an integer-pel precision in operation S1110, then the decoding apparatus checks whether or not the MVD based on the range to which the coded value of the MVD belongs has a half-pel precision (S1130).

If the MVD has a half-pel precision in operation S1130, then the decoding apparatus derives a representative value for the coded value of the MVD in consideration of the half-pel precision (S1140).

If the MVD does not have a half-pel precision in operation S1130, then this corresponds to a case where the MVD has a quarter-pel precision, and the decoding apparatus derives a representative value for the coded value of the MVD in consideration of the quarter-pel precision (S1150).

The above-described decoding method may be shown, for example, like the following drawings.

Figure 12:
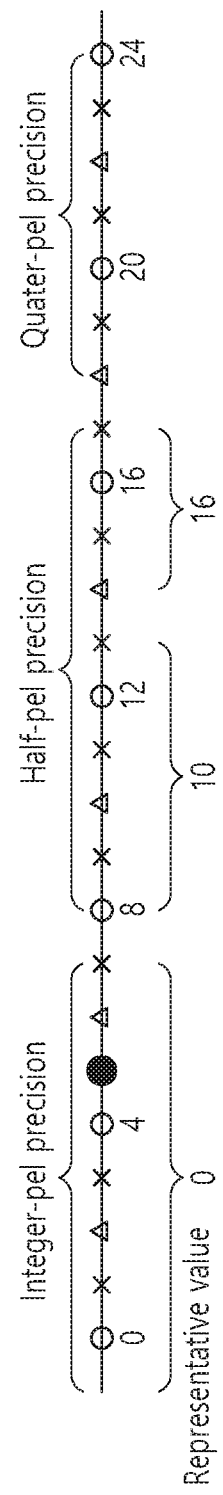
FIGS. 12 to 14 are views illustrating a method for decoding MVD values in integer-pel precision, half-pel precision, or quarter-pel precision according to an embodiment of the present invention.
Figure 13:
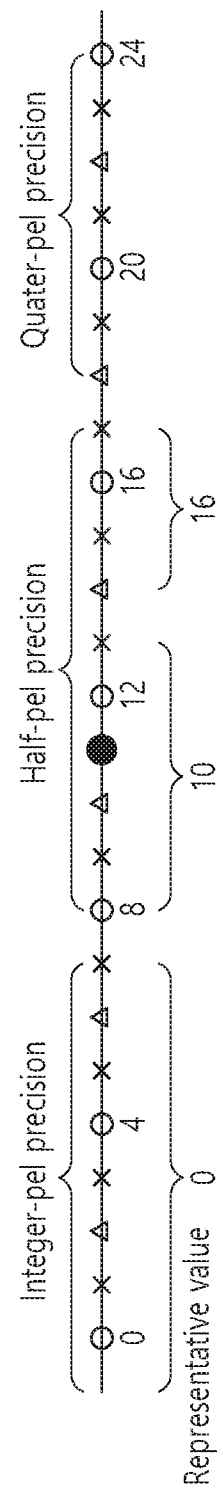
Figure 14:
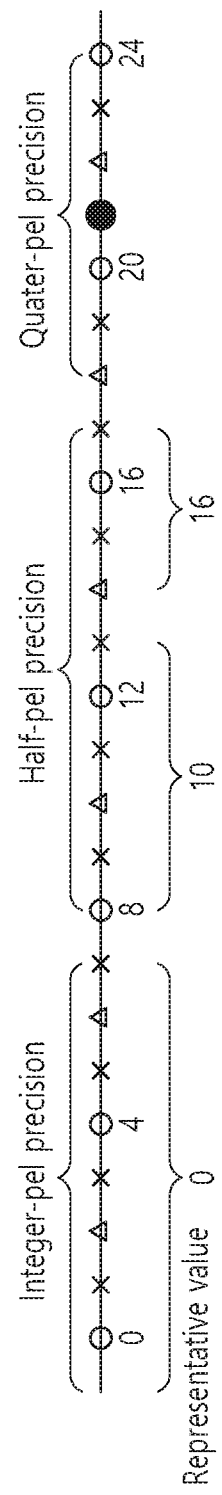

FIGS. 12 to 14 are views illustrating a method for decoding MVD values in integer-pel precision, half-pel precision, or quarter-pel precision according to an embodiment of the present invention.

In FIGS. 12 to 14, a range of −8≤MVD<8 is set to have an integer-pel precision, a range of 8≤MVD<18 is set to have a half-pel precision, and a range of 18≤MVD<24 is set to have a quarter pel precision. Also, in FIGS. 12 to 14, it is assumed that a non-linear AMVR is applied.

Referring to FIG. 12, when the original value of the MVD is 5, the value 5 is represented by a representative value 0 to be encoded to a value 0, and the decoding apparatus decodes the encoded value 0 to obtain a value 0. The decoding apparatus may derive an MV for a current block by adding the MVD of 0 to the MVP.

Also, referring to FIG. 13, when the original value of the MVD is 11, the value 11 is represented by a representative value 10, and the 10 is scaled down to be encoded to a value 1. Also, the decoding apparatus decodes and scales up the encoded value 1 to obtain 10 as the MVD value.

Referring to FIG. 14, when the value of MVD is 21, the representative value of the value 21 is 21, and if the range is 1 from 19, the value 21 is encoded to 6. Based on 0 as a reference point, 0 to 7 may be encoded to a value 0, 8 to 13 may be encoded to a value 1, and 14 to 17 may be encoded to a value 2. Also, since the range is set to 1 from 19, sequentially, 18 may be encoded to a value 3, 19 may be encoded to a value 4, 20 may be encoded to a value 5, and 21 may be encoded to a value 6. In this case, the decoding apparatus may decode the encoded value 6, and may obtain a value of 21 as the MVD value corresponding to the coded value 6.

Alternatively, when the range is set to 4 by default after 19, the representative value of 21 may be 20, and the value 20 may be encoded into a value 3. In this case, the decoding apparatus may decode the value 3, and obtain a value of 20 as an MVD value corresponding to the value 3.

The range information for the adaptive MVD precision as described above may be indicated based on the SPS syntax and the slice header syntax as described in the third embodiment. In this case, the SPS syntax may include syntax elements related to the number of MVD precision range table candidates, and may include information about at least one of an integer-pel precision range and a half-pel precision range for each MVD precision range table candidate. A precision range table index indicating one of the MVD precision range table candidates may be indicated through the slice header syntax.

Alternatively, the syntax for non-linear AMVR range parameters may include information on the integer-pel precision range and the half-pel precision range as shown in the following Table 7.

TABLE 7

```
non_linear_amvr_range_parameters( ) {
    num_non_linear_range_table_candidate
    for(rangeTableIdx=0; rangeTableIdx<
    num_non_linear_range_table_candidate;rangeTableIdx++){
        first_range_value
```

TABLE 7-continued

```
        first_range_representative_value
        second_range_value
        second_range_representative_value
        third_range_value
        third_range_representative_value
        integer_pel_precision_range
        half_pel_precision_range
        }
    }
}
```

Referring to Table 7, num_non_linear_range_table_candidate represents the number of non-linear range table candidates. Each non-linear range table candidate may include integer_pel_precision_range and half_pel_precision_range syntax elements.

Here, the integer_pel_precision_range represents an integer-pel precision range, and the half_pel precision_range represents a half-pel precision range. The integer-pel precision range and the half-pel precision range may be used in combination with the first range to the third range based on first_range_value, first_range_representative_value, second_range_value, second_range_representative_value, third_range_value, and third_range_representative_value of Table 7.

For example, values representing each precision range may be scaled down and transmitted. In this case, a value indicated by the integer_pel_precision_range may be scaled down to 4 to be transmitted, and a value indicated by the half_pel precision_range may be transmitted after a difference value with the value indicated by the integer_pel_precision_range scales down to 2. For example, in FIG. 10, the value 8 that is a value indicated by the integer_pel_precision_range is scaled down to 4 and transmitted as a value of 2, and a value 5 scaled down to 2 from 10 which is a difference value between a value 8 and a value 18 represented by the integer_pel_precision_range is transmitted. The decoding apparatus may decode each precision range through the procedure opposite to the above-mentioned procedure.

Figure 15:
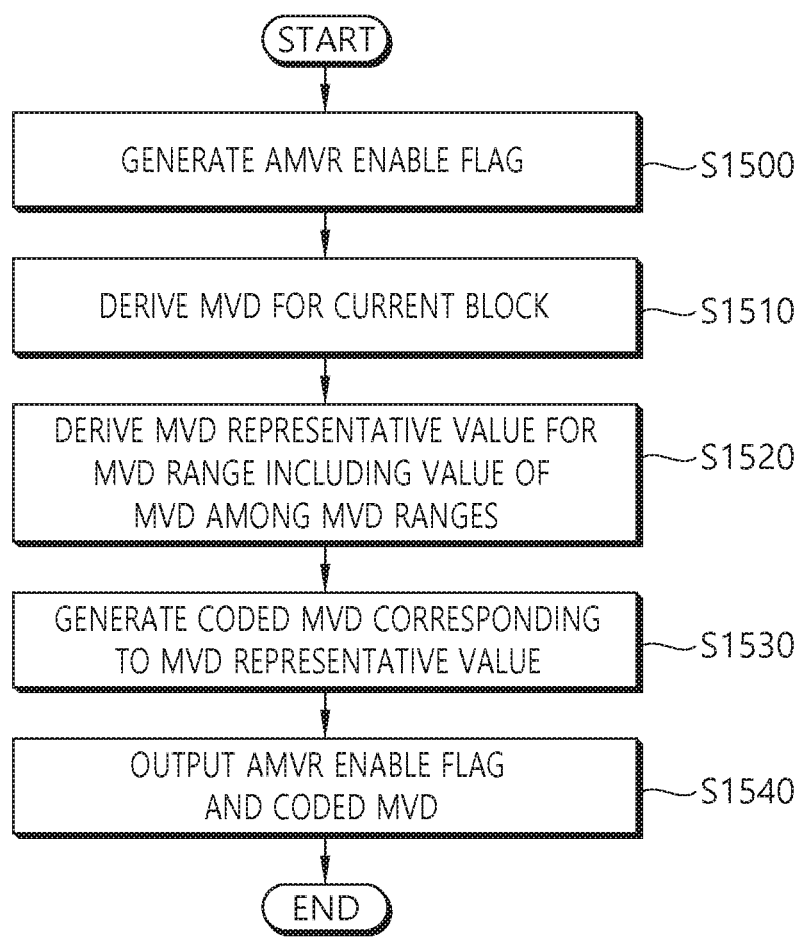
FIG. 15 is a schematic view illustrating an example of a video coding method according to an embodiment of the present invention.

FIG. 15 is a schematic view illustrating an example of a video coding method according to an embodiment of the present invention. The method disclosed in FIG. 15 may be performed by an encoding apparatus.

Referring to FIG. 15, the encoding apparatus generates an AMVR enable flag (S1500). The encoding apparatus determines whether to perform AMVR for inter prediction of a current block. The encoding apparatus may determine to perform the AMVR when it is determined that the performing of the AMVR is better for RD optimization, and may set a value of the AMVR enable flag to 1.

The encoding apparatus derives an MVD for the current block (S1510). The MVD may be an MVD of the quarter-pel unit. Alternatively, when adaptive MVD precision is applied, the MVD may be an integer-pel or a half-pel unit according to an MVD precision range.

The encoding apparatus may derive an MV for the current block through motion estimation. The encoding apparatus may derive an MVP for the current block based on the spatial neighboring blocks and temporal neighboring block (or temporal corresponding blocks) of the current block. The encoding apparatus may derive the MVP for the current block based on the MV and the MVP. Here, the MVP may be an MVP of the quarter-pel unit. Alternatively, the MVP may be an MVP of integer-pel unit, obtained by rounding off a temporary MVP of the quarter-pel unit to the integer-pel unit.

The encoding apparatus derives an MVD representative value for an MVD range including the MVD value among a plurality of MVD ranges (S1520), and generates a coded MVD corresponding to the MVD representative value (S1530).

As an example, the plurality of MVD ranges may be linear MVD ranges having an equal range. In this case, the MVD representative value may be a value obtained by rounding down the MVD value plus 2 to a multiple of 4. In this case, the coded MVD may be a value obtained by scaling down the MVD representative value to 4.

As another example, the plurality of MVD ranges may be non-linear MVD ranges having an unequal range. In this case, MVD ranges located in the central region among the non-linear MVD ranges may have a relatively wide range. In this case, MVD ranges corresponding to the coded MVD values −1, 0, and 1 among the non-linear MVD ranges may have a relatively wider range than residual MVD ranges. When the coded MVD value is one of −1, 0, and 1, the MVD representative value may be a value obtained by rounding down the MVD value plus 4 to a multiple of 8. In this case, the coded MVD value may be a value obtained by scaling down the MVD representative value to 8.

The encoding apparatus outputs the AMVR enable flag and the coded MVD through a bitstream (S1540). For example, the AMVR enable flag may be outputted through the bitstream at an SPS level. Also, the coded MVD may be outputted through the bitstream at a PU level.

The output bitstream may be transmitted to the decoding apparatus via a network or a storage medium.

On the other hand, although not shown, the encoding apparatus may generate a non-linear AMVR range flag indicating whether the plurality of MVD ranges have an unequal range. The value 0 of the non-linear AMVR range flag indicates that the plurality of MVD ranges have an equal range and the value 1 of the non-linear AMVR range flag may indicate that the plurality of MVD ranges have an unequal range. The encoding apparatus may output the generated non-linear AMVR flag through the bitstream.

When the value of the non-linear AMVR range flag is 1, the encoding apparatus may generate and output non-linear AMVR-related parameters through the bitstream. The non-linear AMVR-related parameters may include the information described in Tables 5 and 7 above. For example, the non-linear AMVR range-related parameter may include information on the size of the central three of the MVD ranges and representative values of the corresponding ranges. In addition, the non-linear AMVR range-related parameter may include information on the number of non-linear range table candidates. In this case, the non-linear AMVR range-related parameter may include information on the size of the central three MVD ranges corresponding to each of the non-linear range table candidates and representative values of the corresponding ranges. The encoding apparatus may generate a range table index indicating one of the non-linear range table candidates, and may output the range table index through the bitstream. For example, the range table index may be outputted through the bitstream at a slice header level.

On the other hand, the expression unit of the MVD may be adaptively changed according to the range using an adaptive MVD precision range. In this case, the encoding apparatus may generate MVD precision information indicating whether the MVD has an integer-pel precision or a half-pel precision, and may output the MVD precision information through the bitstream. The MVD precision information may include at least one of the integer_pel_precision_range syntax element and the half_pel_precision_range syntax element described above.

Figure 16:
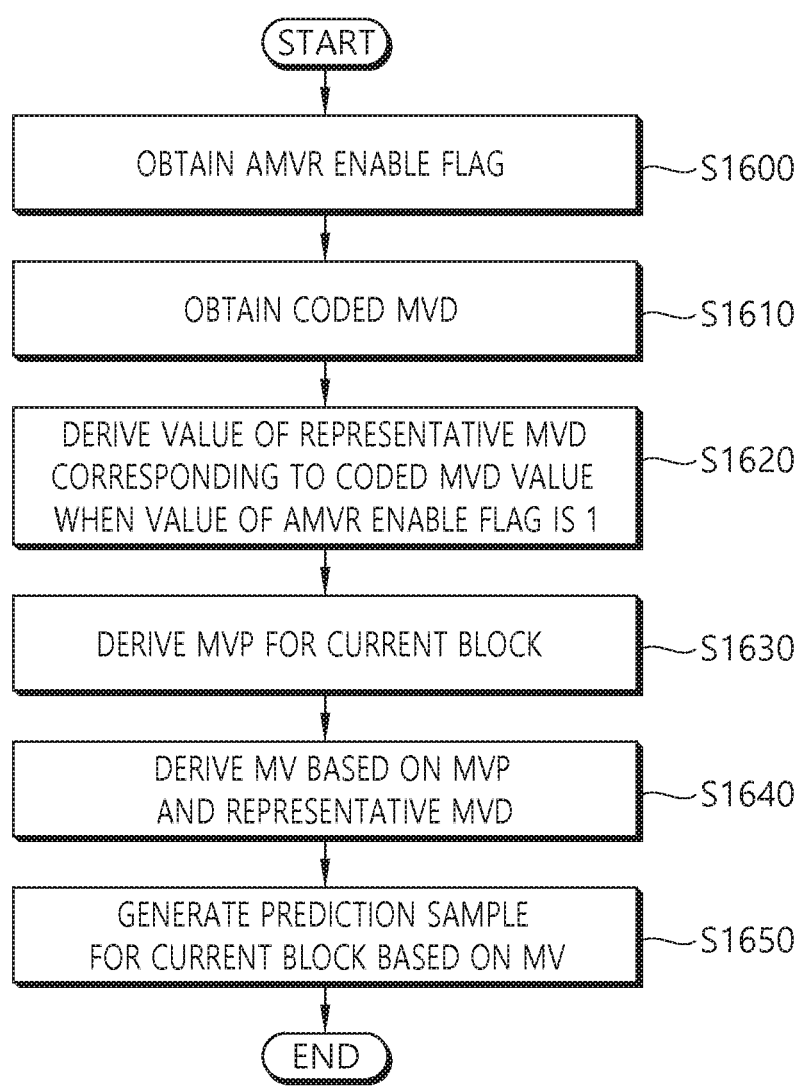
FIG. 16 is a schematic view illustrating an example of an inter prediction method according to an embodiment of the present invention.

FIG. 16 is a schematic view illustrating an example of an inter prediction method according to an embodiment of the present invention. The method disclosed in FIG. 16 may be performed by a decoding apparatus.

Referring to FIG. 16, the decoding apparatus parses and obtains an AMVR enable flag from bitstream received from the encoding apparatus (S1600). The decoding apparatus may receive the bitstream through a network or a storage medium. The AMVR enable flag may be parsed and obtained, for example, at an SPS level.

The decoding apparatus parses and obtains the coded MVD from the bitstream (S1610). For example, the coded MVD may be parsed and obtained at a PU level.

When the value of the AMVR enable flag is 1, the decoding apparatus derives the value of the representative MVD corresponding to the coded MVD value (S1620). The MVD representative value is a representative value for an MVD range including a value of an original MVD among a plurality of MVD ranges.

For example, the plurality of MVD ranges may be linear MVD ranges having an equal range, and the coded MVD value may be a value obtained by scaling up the MVD representative value to 4.

As another example, the plurality of MVD ranges may be non-linear MVD ranges having an unequal range. In this case, MVD ranges located in the central region among the non-linear MVD ranges may have a relatively wide range. In this case, MVD ranges corresponding to the coded MVD values −1, 0, and 1 among the non-linear MVD ranges may have a relatively wider range than residual MVD ranges. When the coded MVD value is one of −1, 0, and 1, the MVD representative value may be a value obtained by rounding down the MVD value plus 4 to a multiple of 8. In this case, the MVD representative value may be a value obtained by scaling up the coded MVD value to 8.

The original MVD may be an MVD of the quarter-pel unit. Alternatively, when adaptive MVD precision is applied, the original MVD may be an integer-pel or a half-pel unit, according to the MVD precision range.

The decoding apparatus derives an MVP for the current block based on the spatial neighboring blocks and temporal neighboring block (or temporal corresponding block) of the current block (S1630). Here, the MVP may be an MVP of the quarter-pel unit. Alternatively, the MVP may be an MVP of integer-pel unit, obtained by rounding off a temporary MVP of the quarter-pel unit to the integer-pel unit.

The decoding apparatus derives an MV for the current block based on the MVP and the representative MVD (S1640). The decoding apparatus may derive the MV for the current block by adding the MVP and the representative MVD.

The decoding apparatus performs inter prediction based on the MV, and generates a prediction sample (or prediction sample array) for the current block (S1650). The decoding apparatus may generate the prediction sample (or prediction sample array) for the current block based on a reconstructed sample (or reconstructed sample array) in a reference block at a relative position indicated by the MV on a reference picture. The decoding apparatus may obtain the transform coefficients regarding the residual signal from the bitstream. The decoding apparatus may invert the transform coefficients, and may obtain a residual sample (or a residual sample array) for the current block from the transform coefficients. The decoding apparatus may generate the reconstructed sample and reconstructed picture based on the prediction samples and the residual samples.

On the other hand, although not shown, the decoding apparatus may receive through the bitstream a non-linear AMVR range flag indicating whether or not the plurality of MVD ranges have an unequal range. The value 0 of the non-linear AMVR range flag indicates that the plurality of MVD ranges have an equal range and the value 1 of the non-linear AMVR range flag may indicate that the plurality of MVD ranges have an unequal range. The non-linear AMVR-related parameters may include the information described in Tables 5 and 7 above. For example, the non-linear AMVR range-related parameter may include information on the size of the central three of the MVD ranges and representative values of the corresponding ranges. In addition, the non-linear AMVR range-related parameter may include information on the number of non-linear range table candidates. In this case, the non-linear AMVR range-related parameter may include information on the size of the central three MVD ranges corresponding to each of the non-linear range table candidates and representative values of the corresponding ranges. The decoding apparatus may derive the representative MVD value based on the non-linear AMVR range-related parameter and the coded MVD value. In this case, the decoding apparatus may obtain a range table index from the bitstream, and may select one of the non-linear range table candidates based on the range table index. The decoding apparatus may know the size of MVD ranges and the representative values based on the selected candidate, and derive a representative MVD value corresponding to the coded MVD value based on the size of the MVD ranges and the representative values.

On the other hand, using an adaptive MVD precision range, the expression unit of the original MVD may be adaptively changed according to the precision range. In this case, the decoding apparatus may obtain, through the bitstream, MVD precision information indicating whether or not the original MVD has an integer-pel precision or a half-pel precision, and may derive the MVD range and the representative MVD value corresponding to the coded MVD value based on the MVD precision information. The MVD precision information may include at least one of the integer_pel_precision_range syntax element and the half_pel_precision_range syntax element described above.

According to an embodiment of the present invention described above, the inter prediction for a current block can be efficiently performed while using little additional information. Also, according to an embodiment of the present invention, the amount of bits allocated to the MVD can be reduced and the overall coding efficiency can be increased.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image encoding method performed by an encoding apparatus, the method comprising:
generating an Adaptive Motion Vector Range (AMVR) enable flag;
deriving a Motion Vector Difference (MVD) for a current block;
deriving an MVD representative value for an MVD range comprising a value of the MVD among a plurality of MVD ranges;
generating a coded MVD corresponding to the MVD representative value; and
outputting the AMVR enable flag and the coded MVD through a bitstream,
wherein the method further comprising:
generating a non-linear AMVR range flag that indicates whether or not the plurality of MVD ranges have an unequal range size; and
outputting the non-linear AMVR range flag through the bitstream.

2. The method of claim 1, wherein:
the plurality of MVD ranges are linear MVD ranges having an equal range size,
the MVD representative value is a value obtained by rounding down the MVD value plus 2 to a multiple of 4, and
the coded MVD value is a value obtained based on dividing the MVD representative value by 4.

3. The method of claim 1, wherein the plurality of MVD ranges are non-linear MVD ranges having unequal range sizes, and each size of first MVD ranges corresponding to the coded MVD values −1, 0, and 1 among the non-linear MVD ranges is larger than each size of second MVD ranges among the non-linear MVD ranges,
wherein the second MVD ranges are remainder of the non-linear MVD ranges excluding the first MVD ranges.

4. The method of claim 1, wherein:
the plurality of MVD ranges are non-linear MVD ranges having unequal range sizes, and
when the coded MVD value is one of −1, 0, and 1,
the MVD representative value is a value obtained by rounding down the MVD value plus 4 to a multiple of 8, and
the coded MVD value is a value obtained based on dividing the MVD representative value by 8.

5. The method of claim 1, further comprising outputting a linear AMVR range-related parameter through the bitstream when the value of the non-linear AMVR range flag is 1,
wherein the non-linear AMVR range-related parameter comprises information about sizes of the central three MVD ranges of the MVD ranges and representative values of the corresponding ranges.

6. The method of claim 5, wherein the non-linear AMVR range-related parameter comprises information about a number of non-linear range table candidates, and
the non-linear AMVR range-related parameter comprises information about the size of the central three MVD ranges and the representative values of the corresponding ranges according to each of the non-linear range table candidates.

7. The method of claim 6, further comprising:
generating a range table index indicating one of the non-linear range table candidates; and
outputting the range table index through the bitstream.

8. The method of claim 1, further comprising:
generating MVD precision information indicating whether the MVD has an integer-pel precision or a half-pel precision;
outputting the MVD precision information through the bitstream.

9. An inter prediction method performed by a decoding apparatus, the method comprising:
obtaining an Adaptive Motion Vector Range (AMVR) enable flag from a bitstream;
obtaining a coded Motion Vector Difference (MVD) from the bitstream;
deriving a value of a representative MVD corresponding to a value of the coded MVD when the value of the AMVR enable flag is 1;
deriving a Motion Vector Predictor (MVP) for a current block based on a neighboring block of the current block;
deriving a Motion Vector (MV) for the current block based on the MVP and the representative MVD; and
generating a prediction sample for the current block based on the MV,
wherein the method further comprising:
obtaining a non-linear AMVR range flag indicating whether or not the plurality of MVD ranges have an unequal range size from the bitstream.

10. The method of claim 9, wherein the MVD representative value is a representative value for an MVD range comprising a value of an original MVD among a plurality of MVD ranges.

11. The method of claim 10, wherein the plurality of MVD ranges are linear MVD ranges having an equal range size, and
the coded MVD value is a value obtained based on dividing the MVD representative value by 4.

12. The method of claim 10, wherein the plurality of MVD ranges are non-linear MVD ranges having unequal range sizes, and
each size of first MVD ranges corresponding to the coded MVD values −1, 0, and 1 among the non-linear MVD ranges is larger than each size of second MVD ranges among the non-linear MVD ranges,
wherein the second MVD ranges are remainder of the non-linear MVD ranges excluding the first MVD ranges.

13. The method of claim 10, further comprising:
obtaining a non-linear AMVR range-related parameter from the bitstream when a value of the non-linear AMVR range flag is 1,
wherein the representative MVD value is derived based on the non-linear AMVR range-related parameter and the coded MVD value.

14. The method of claim 13, further comprising obtaining a range table index through the bitstream,
wherein:
the non-linear AMVR range-related parameter comprises information about a number of non-linear range table candidates,
the non-linear AMVR range-related parameter comprises information about sizes of the central three MVD ranges and the representative values of the corresponding ranges according to each of the non-linear range table candidates, and the range table index indicates one of the non-linear range table candidates.

* * * * *